United States Patent [19]

Jamison et al.

[11] 4,360,715
[45] Nov. 23, 1982

[54] REEL ASSEMBLY FOR FLEXIBLE TUBING AND THE LIKE

[75] Inventors: Thomas D. Jamison, Fort Oglethorpe, Ga.; Frank T. Radcliff, Chattanooga, Tenn.

[73] Assignee: Electric Power Research Institute, Inc., Palo Alto, Calif.

[21] Appl. No.: 115,506

[22] Filed: Jan. 25, 1980

[51] Int. Cl.$^3$ .......................................... H02G 11/00
[52] U.S. Cl. ................................. 191/12.2 R; 242/83
[58] Field of Search ...................... 191/12.2 R, 12.4; 242/83

[56] References Cited

U.S. PATENT DOCUMENTS 302,362  7/1884  Sweet ................................... 242/83
2,245,823  6/1941  Rappaport ....................... 242/83 X
2,892,899  6/1959  Connell ............................. 242/83 X

FOREIGN PATENT DOCUMENTS 691817  5/1953  United Kingdom ........... 191/12.2 R

Primary Examiner—Richard A. Schacher

[57] ABSTRACT

A reel assembly for flexible tubing includes a drum having a conically shaped outer wall. The maximum diameter of the drum is less than the natural cast diameter of the tubing whereby the tubing coils in pressure contact with the inner surface of the outer wall. The friction of the tubing coils against the drum wall provides drive of the reel. Electrical interconnection to the tubing is provided by a cable extending in the central bearing mount and coiled loosely about the central bearing mount thereby allowing for expansion or contraction as the reel rotates.

6 Claims, 3 Drawing Figures

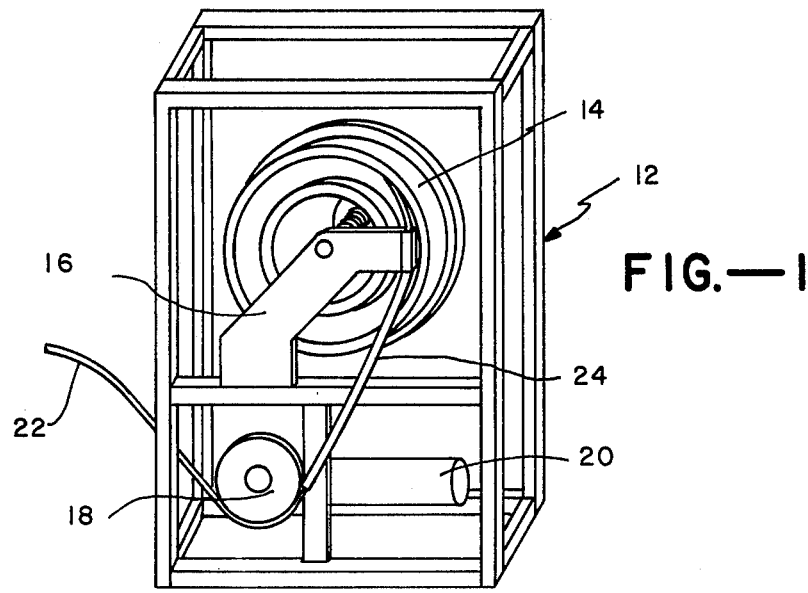
FIG.—1
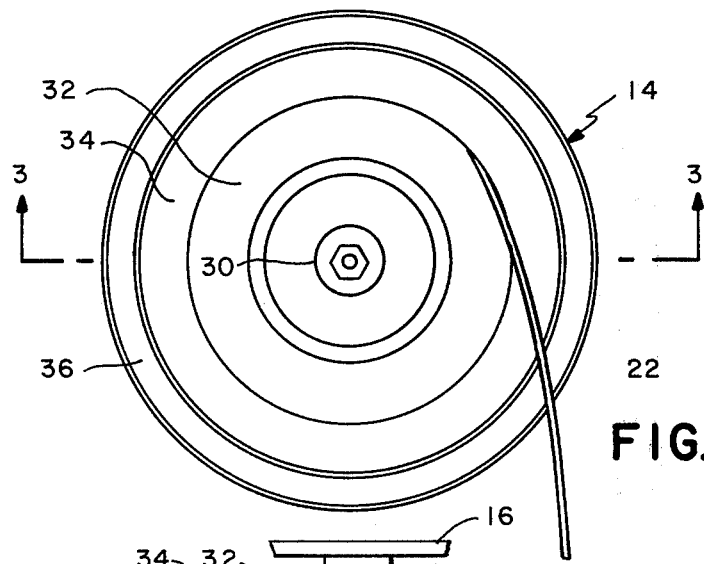
FIG.—2
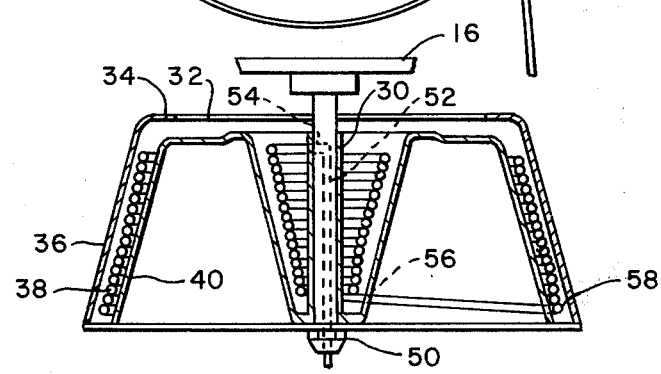
FIG.—3

REEL ASSEMBLY FOR FLEXIBLE TUBING AND THE LIKE

This invention relates generally to reel assemblies, and more particularly the invention relates to reel assemblies for flexible tubing and the like.

Nylon or plastic tubing is used to pull probes through steam pipes or tubes of nuclear power generation systems to inspect for defects. The tubing is hollow and accommodates electrical conductors which interconnect the probes with external instruments. The tubing is received on pickup reels as a probe is pulled during tube inspection.

Conventional take-up reels for flexible tubing require a separate drive which must be synchronized with the tubing drive. Such assemblies are complicated and often present operation problems in overfeeding or underfeeding the tubing. Further, the assemblies are relatively expensive and require periodic maintenance.

Accordingly, an object of the present invention is an improved reel assembly for flexible tubing and the like.

Another object of the invention is a reel assembly which does not require drive means.

Still another object of the invention is a reel and assembly which is simple and inexpensive.

Yet another object of the invention is a reel assembly which requires little maintenance.

A feature of the invention is the use of the natural cast diameter of the flexible tubing in driving the reel.

Briefly, in accordance with the invention, a reel assembly includes a support structure and a reel which is rotatably supported by the structure. The reel has a central bearing mount and an outer wall spaced from the central bearing mount for receiving coils of tubing. One end of the reel is open for receiving the tubing.

Preferably, the outer reel wall is conical in shape to provide proper stacking of the tubing along the interior surface of the wall. By maintaining the maximum diameter of the drum smaller than the natural cast diameter of the tubing, tubing moves down the interior surface of the outer wall in seeking its natural cast diameter and thus insures proper stacking of the tubing. In addition, the pressure of the stacked tubing against the interior surface provides sufficient friction for movement of the tubing to rotate the reel.

Guide means is provided for feeding tubing to the reel. The guide means includes means for propelling the tubing, and a guide tube extends from the drive means to the opening of the reel for directing the tubing into the reel.

Electrical interconnection means extends into the central bearing mount and is connected to the tubing by means of an electrical conductor which is loosely coiled about the central bearing mount to thereby allow for expansion or contraction as the reel rotates, thus preventing twisting of the electrical conductors.

The invention and objects and features thereof will be more readily apparent from the following detailed description and appended claims when taken with the drawing, in which:

FIG. 1 is a perspective view of one embodiment of a reel assembly in accordance with the present invention.

FIG. 2 is an end view of the reel in the assembly of FIG. 1.

FIG. 3 is a section view of the reel of FIG. 2 taken along lines 3—3.

Referring now to FIG. 1 of the drawing, one embodiment of a reel assembly for flexible tubing and the like in accordance with the present invention is illustrated. The assembly includes a support structure shown generally at 12 and a reel shown generally at 14 which is rotatably supported on mounting bracket 16 of structure 12. Mounted on the bottom of structure 12 is a tube drive assembly including roller means 18 and drive motor 20 which propel flexible tubing 12 through a guide tube 24 to reel 14. Flexible tubing 22 is directed into the open face of reel 14 by means of the pressure plate 18 and guide 24, and the guide tube 24 guides the flexible tubing into the reel at an appropriate angle to cause rotation of the reel. As the flexible tubing is inserted into the reel, the tubing has a tendency to coil to its natural cast diameter, thereby coiling in pressure contact with the inner surface of the outer reel wall.

FIG. 2 is an end view of reel 14 looking into the open face 32 thereof which receives the tubing. The reel includes a central bearing mount 30 for rotatably supporting the reel on the support structure 12, and the open end 32 of the reel includes a flange portion 34 which establishes an outer limit for the coils of flexible tubing 22. The outer wall 36 of reel 14 is conically shaped whereby the coils of the tubing expand into pressure engagement with the inner surface of the wall as the tubing is inserted.

FIG. 3 is a section view of the reel 14 in FIG. 2 taken along the lie 3—3 and further illustrates the tapered outer wall 36 of the reel with the coils 38 of the flexible tubing in abutment with the inner surface of the outer wall 36. The maximum diameter of the reel is less than the natural cast diameter of the tubing. The reel includes an inner body portion 40 having a wall which cooperates with the inner surface of wall 36 to define the cavity in which the coils 38 are formed. The dimensions of the cavity are such that the coils 38 will not overlap within the cavity. It will be appreciated that due to the natural cast diameter of the tubing being greater than the maximum diameter of the drum, the coils will form in pressure engagement with the inner surface of the outer wall 36 and due to the coils expanding downwardly to attain a maximum diameter, overlapping of the coil may not occur. However, by providing the wall 40 parallel to the outer wall 36, overlapping of the coils is precluded.

In accordance with one feature of the invention, electrical interconnection means is provided through the central bearing mount to electrical conductors within the flexible tubing. As shown in FIG. 3 an electrical connector 50 is provided on one end of the bearing mount with an electrical cable 52 extending through the core of the bearing mount. The cable exits the bearing mount at 54 and is loosely coiled about the bearing mount to a point 56 where the cable passes through the reel into electrical engagement with the end 58 of the flexible tubing. The coils of the cable 52 expand and contract as the drum rotates thus preventing twisting of the cable during rotation.

The reel assembly in accordance with the present invention is relatively maintenance free and requires no external drive force other than the flexible tubing. Drive of the reel is synchronized with the tubing since the tubing rotates the reel. Electrical interconnection with the tubing is direct without use of slip rings or the like.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A reel assembly for flexible tubing and the like comprising
    a support structure,
    a reel rotatably supported by said structure, said reel having a central bearing mount, an outer wall having an inner surface spaced from said central bearing mount for receiving coils of tubing, an inner wall spaced from said outer wall for confining coils of tubing, an open end for receiving tubing and the like with said outer wall tapering inwardly toward said open end, means for guiding tubing to and from said reel member, and electrical interconnection means extending into said central bearing mount and connected to said tubing, said electrical connection means including an electrical conductor coiled about the outside of said central bearing mount.
2. A reel assembly as defined by claim 1 wherein said means for guiding includes means for driving said tubing to and from said reel.
3. A reel assembly as defined by claim 2 wherein said menas for driving includes a roller means and actuator means for rotating said roller means.
4. A reel assembly as defined by claim 3 wherein said means for driving further includes a guide tube for directing said tubing into said reel.
5. A reel assembly as defined by claim 1 wherein said inner surface has a maximum diameter which is less than the natural cast diameter of said tubing whereby said tubing moves down said inner surface in seeking its natural cast diameter.
6. A rotatable reel for electrical cable comprising a drum having a conically shaped outer wall, said outer wall having an inner surface for receiving said cable, said inner surface having a maximum diameter which is less than the natural cast diameter of said cable whereby said cable moves down said inner surface in seeking its natural cast diameter, a central bearing mount, an open end for receiving cable, electrical interconnection means extending into said central bearing mount and connected to said cable, said electrical connection means further including an electrical conductor coiled about the outside of central bearing mount.

* * * * *